United States Patent [19]

Zaniewski

[11] 4,186,468
[45] Feb. 5, 1980

[54] RING CLAMP AND METHOD OF MAKING SAME

[76] Inventor: Michel H. Zaniewski, Avenue Ferdinand de Lesseps, 34110 Frontignan, France

[21] Appl. No.: 902,162

[22] Filed: May 2, 1978

[30] Foreign Application Priority Data

May 2, 1977 [FR] France ................... 77 13790

[51] Int. Cl.² .................. A44B 21/00; F16L 33/00
[52] U.S. Cl. ...................... 24/243 B; 24/19; 24/280; 248/231; 98/83
[58] Field of Search ............ 24/19, 280, 281, 282, 24/243 B, 73 LA; 98/83, 122; 248/231

[56] References Cited

U.S. PATENT DOCUMENTS 1,601,612  9/1928  Edwards ................... 24/279

FOREIGN PATENT DOCUMENTS 1289547  2/1962  France ................... 98/83

Primary Examiner—Bernard A. Gelak
Attorney, Agent, or Firm—Karl F. Ross

[57] ABSTRACT

A ring clamp has a pair of flexible sheet-metal strips formed into a ring with one end of each strip juxtaposed with the one end of the other strip, and the other end of each strip lying intermediate the ends of the other strips. The buckles are each formed of a pair of sheet-metal parts one of which has ends bent over and formed with channels into which fit similar channels of another latch part whose ends are in turn bent over the first part for locking-together of the entire buckle into a rigid unit without the use of welding or rivets. Furthermore each buckle has inwardly directed teeth that can bite into the object being clamped. When the ends of the clamp are drawn together to tighten it around an object the two buckles are tightly pressed against the object and prevent sliding of the two strips relative to each other.

5 Claims, 7 Drawing Figures

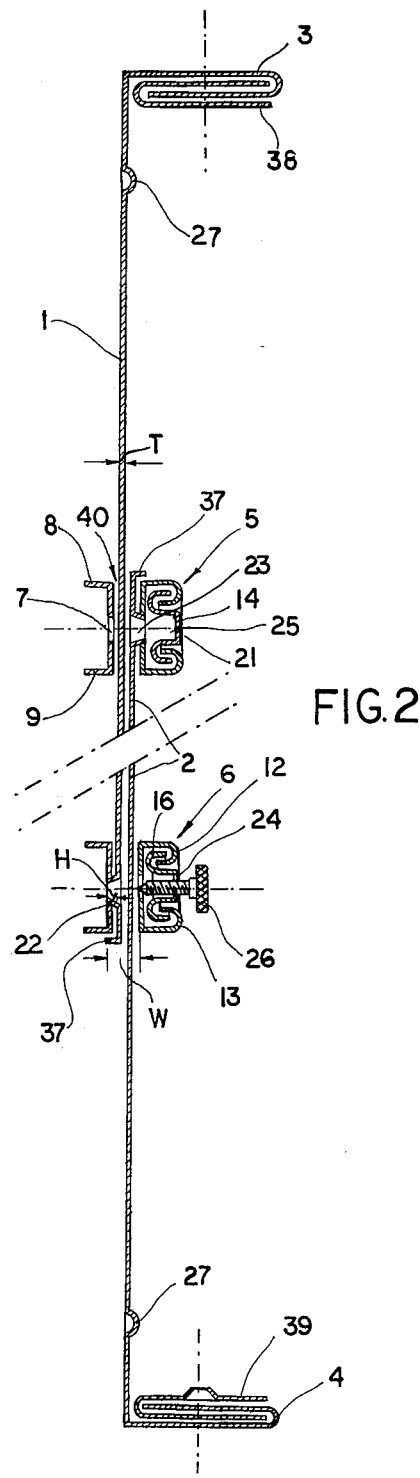
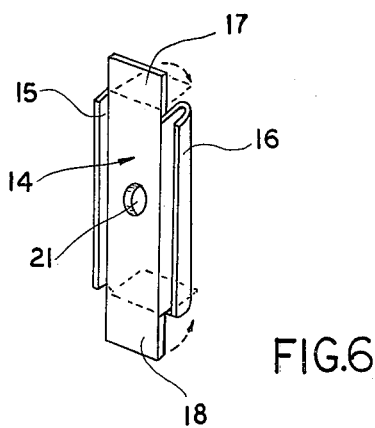
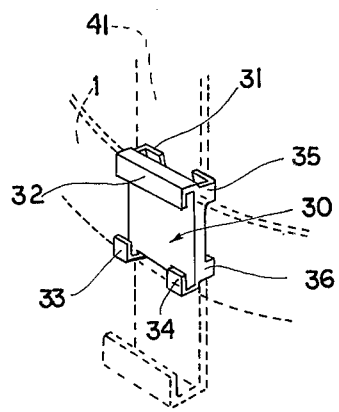

RING CLAMP AND METHOD OF MAKING SAME

FIELD OF THE INVENTION

The present invention relates to a ring clamp. More particularly this invention concerns such a clamp which is of adjustable overall length.

BACKGROUND OF THE INVENTION

A ring clamp normally is constituted as an annulus formed of one or more metal strips having angularly spaced ends that can be brought toward each other to secure an object within the annulus about another object. Such a clamp is used, for instance, to mount in place a chimney cap such as disclosed in my copending application Ser. Nos. 797,174 and 869,222 filed 16 May 1977 and 13 Jan. 1978, respectively, whose entire disclosures are herewith incorporated.

Such a clamp normally comprises several parts. In a typical adjustable clamp a pair of overlapping metal strips are used at each end of which is provided a buckle surrounding an intermediate portion of the other strip. Furthermore the juxtaposed ends of the two strips are provided with fittings that allow them to be drawn towards each other by a tightening screw and a nut. Thus it is possible by sliding the buckles to vary the size of the clamp, and to carry out the final tightening by means of this screw.

Such arrangements are normally manufactured in a relatively complex process. Frequently it is necessary to solder or rivet the buckles to ensure sufficient strength, as the angular forces effective on these buckles are considerable.

Thus the manufacture of such a clamp normally is relatively complex. It is either necessary to provide considerable automatic machinery to produce such a clamp, or to employ a good deal of expensive expert labor. Either way the result is that such a clamp is a relatively expensive item.

OBJECTS OF THE INVENTION

It is therefore an object of the present invention to provide an improved ring clamp and method of making same.

Another object is to provide such a clamp which can easily be produced at a relatively low cost.

SUMMARY OF THE INVENTION

These objects are attained according to the instant invention in a clamp comprised of a pair of metal strips formed into an annulus with one end of each strip between the ends of the other strip and the other ends of the strips being angularly spaced so that they can be drawn together by a clamping member such as a screw. A buckle is provided on the one end of each strip and slidably receives the other strip. Each of these buckles is formed exclusively by stamping and bending two pieces of metal which are fitted together in such a manner that they cannot pull apart. The buckles are set up so that when the strips are snugly fitted around an object to be clamped these buckles are pressed tightly against this object and are each locked to the strip that is normally slidable in it.

According to further features of this invention each buckle is formed of a pair of sheet-metal parts. The one part has a pair of bent-over ends that lie on the outside of the clamp and that together form a pair of parallel channels transverse to the clamp. The other part is a so-called latch part and has a pair of doubled-over edges that mate with these channels, and a pair of ends that can be bent over the first-mentioned part to lock the two together. The structure thus formed is extremely rigid, yet can be assembled with ease by a relatively unskilled worker or automatically.

The other side of the buckle, that is the inner face thereof, is provided with bent-in edges formed with teeth that can bite into the object about which the clamp is being secured. Thus as the clamp is tightened each strip will press the buckle between its ends tightly against the object and prevent slipping, but when loose the two strips can be slid relative to each other.

BRIEF DESCRIPTION OF THE DRAWING

FIG. 1 is a perspective view of a clamp according to this invention;

FIG. 2 is a schematic top view of the clamp according to this invention in a straightened-out condition;

FIGS. 3 and 4 are back and front perspective views, respectively, of the buckle part of the buckle according to this invention;

FIG. 5 is a perspective view of the buckle part at an intermediate stage of manufacture;

FIG. 6 is a perspective view of the latch part of the buckle according to this invention; and FIG. 7 is a perspective view of a clip usable with the clamp of the instant invention.

SPECIFIC DESCRIPTION

The clamp according to the instant invention as seen in FIG. 1 basically comprises a pair of substantially identical metal strips 1 and 2 both made of stainless steel and having a predetermined thickness T. The strips 1 and 2 each have one end 3 and 4, respectively, which is bent out and another end at which is provided a respective buckle 5 or 6.

Each of the buckles 5 and 6 as shown in FIGS. 3–5 has a basic part formed with a circular aperture 7 of a diameter D and with a pair of bent-in edges 8 and 9 each formed with a row of sawteeth. Furthermore each of the buckles has an end portion 10 and 11 which originally is coplanar with the rest of the buckle as shown in FIG. 5 but in the finished assembly is bent over as shown in FIGS. 3 and 4. The edges of these bent-over ends 10 and 11 together form inwardly open parallel channels 12 and 13, and the ends of the end portions 10 and 11 which just meet are formed with notches 19 and 20 that together form an aperture in line with and of substantially the same dimension as the aperture 7.

Each of the buckles is formed into a single solid unit by means of a lock plate or part 14 also formed of sheet stainless steel and shown in FIG. 6. This part 14 has a pair of sides formed into channels 15 and 16 and a pair of outwardly extending ends 17 and 18. FIG. 2 shows how the channels 15 and 16 can mate with the channels 12 and 13, with the plate 14 spaced outwardly from the bent-over ends 10 and 11. Thereafter the two end portions or tabs 17 and 18 are bent inwardly over the buckle to lock the unit together. The latch plate 14 is formed with a throughgoing hole 21 of the same diameter as the hole 7.

The strip 1 is formed at its other end with in inwardly bent tab 37 and the strip 2 is similarly formed with a tab 37 that is, however, bent out. The buckles 5 and 6 lie immediately against these tabs 37 in the finished assembly. Furthermore the strips 1 and 2 are formed with respective hole-forming bosses 22 and 23 projecting respectively radially inwardly and outwardly by a height H equal here to the thickness T. These bosses 22 and 23 have outer diameters equal to the diameters D so that the one boss 22 can be received in the hole formed by the notches 19 and 20 of the buckle 5. Furthermore these buckles form rectangular-section passages 40 having a radial dimension or width W equal to slightly more than twice the thickness T.

For assembly the two strips 1 and 2 are juxtaposed as shown in FIG. 2. The main buckle parts as shown in FIG. 5 are then juxtaposed with these strips at the respective other ends thereof and the end portions 10 and 11 are bent over, an operation which can normally be done easily by even a relatively unskilled worker with the aid of a simple pair of pliers. Thereafter the latch strip or plate 15 is slid into each of the buckles and its tabs 17 and 18 are bent over. This part 14 may be of lighter gauge than the rest of the buckle so that the tabs 17 and 18 can be simply bent over by the fingers. This forms the two buckles and makes it possible for the two strips 1 and 2 to pull apart. Of course these operations can all be carried out by means of automatic machinery if desired.

The ends 3 and 4 of the strips 1 and 2 are then made connectable to each other by providing a U-section reinforcement 38 on the end 3 and a U-section speed nut 39 on the end 4, so that the two can eventually be connected together by means of a screw such as shown at 28 in FIG. 1. In order to ensure excellent locking-together of the two strips 1 and 2 before complete tightening thereof it is within the scope of this invention to provide a square nut 24 into the recess 25 formed by one of the lock plates 14 and to thread a screw 26 with a knurled head thereinto. Although once tightened the teeth on the bent-in edges 8 and 9 will bite into the object being clamped, the screw 26 can be used to hold the strips 1 and 2 together during fitting of the clamp around the object. The strips 1 and 2 are also formed with ridges 29 that prevent unintentional relative sliding of the strips 1 and 2 while at the same time permitting sliding when executed intentionally. Each strip 1 and 2 also has adjacent the respective ends 3 and 4 a bump 27 that prevents the respective buckle from approaching the ends 3 and 4 so closely that the screw 28 cannot be manipulated.

FIG. 7 shows how the clamp can be secured on one leg 41 of a chimney cap as described in the above-mentioned copending application by means of a clip 30. To this end the clip 30 has four bent-in tabs 31, 35, and 36 which embrace the leg 41 of the chimney cap. On its outer surface the clip 30 has a bent-over upper edge 32 and bent-up lower tabs 33 and 35 that slidably receive one of the strips, here strip 1, of the clamp. The tabs 31-36 are relatively easy to bend so that the user can bend them in place with fingers alone, and the fit is normally such that relative sliding of the parts is possible for best positioning of the clamp. By means of the clip or several such clips 30 it is possible to temporarily mount the clamp on a chimney cap or the like and hold it in the desired position prior to tightening of the clamping screw 28.

I claim:
1. A clamp comprising:
a pair of flexible and relatively inextensible sheet-metal strips each having a pair of strip ends and normally formed into an annulus with one strip end of one strip spaced angularly from one strip end of the other strip and each other strip end lying against the inner face of the other strip intermediate the strip ends thereof;
a sheet-metal buckle on said other end of each of said strips and having a pair of bend-over ends embracing and slidably receiving the other strip intermediate said strip ends thereof;
means for drawing said one strip ends angularly together and, when said strips are snugly fitted around an object to be clamped, thereby pressing each of said buckles tightly against said object and locking each of said buckles to the strip normally slidable therein.

2. The clamp defined in claim 1 wherein each of said buckles has a main buckle part formed with the respective bent-over ends and a latch buckle part slidably engageable in the respective main buckle part and having ends folded over same.

3. The clamp defined in claim 2 wherein each main buckle part is formed at its bent-over ends with a pair of channels extending generally parallel to each other and transverse to said strips, each latch part being formed with double-over edges extending generally parallel to each other and transverse to said strips and receivable in the respective channels.

4. The clamp defined in claim 3 wherein said clamp is generally centered on an axis parallel to said channels and doubled-over edges, said channels being radially inwardly open and said double-over edges being radially outwardly open, said latch parts lying mainly outside said buckle parts.

5. The clamp defined in claim 3 wherein at least one of said latch parts is formed with a throughgoing hole, said clamp further comprising a screw engageable through said hole with the respective other strip to secure the respective buckle to the respective other strip.

* * * * *